US011408523B2

(12) United States Patent
Wang

(10) Patent No.: US 11,408,523 B2
(45) Date of Patent: Aug. 9, 2022

(54) ONE-WAY VALVE AND AIR SUPPLY SYSTEM FOR MASSAGE POOL

(71) Applicant: ORIENTAL RECREATIONAL PRODUCTS (SHANGHAI) CO., LTD, Shanghai (CN)

(72) Inventor: Zhiyue Wang, Shanghai (CN)

(73) Assignee: ORIENTAL RECREATIONAL PRODUCTS (SHANGHAI) CO., LTD, Shanghai (CN)

(*) Notice: Subject to any disclaimer, the term of this patent is extended or adjusted under 35 U.S.C. 154(b) by 0 days.

(21) Appl. No.: 17/270,520

(22) PCT Filed: Jun. 20, 2019

(86) PCT No.: PCT/CN2019/092059
§ 371 (c)(1),
(2) Date: Feb. 23, 2021

(87) PCT Pub. No.: WO2020/038090
PCT Pub. Date: Feb. 27, 2020

(65) Prior Publication Data
US 2021/0324962 A1    Oct. 21, 2021

(30) Foreign Application Priority Data

Aug. 23, 2018 (CN) .......................... 201810968849.6

(51) Int. Cl.
*F16K 15/06* (2006.01)
*A61H 31/02* (2006.01)
(Continued)

(52) U.S. Cl.
CPC ........... *F16K 15/066* (2013.01); *A61H 33/02* (2013.01); *F16K 17/0466* (2013.01); *A61H 2033/023* (2013.01); *F16K 11/105* (2013.01)

(58) Field of Classification Search
CPC ...... F16K 15/066; F16K 17/0466; F16K 1/44; F16K 11/105; A61H 33/02;
(Continued)

(56) References Cited

U.S. PATENT DOCUMENTS 7,503,082 B2 * 3/2009 Castellote .............. A61H 33/02
137/389
9,254,240 B2 * 2/2016 Lin ..................... A61H 33/0087
(Continued)

FOREIGN PATENT DOCUMENTS

CN    103573582        2/2014
CN    103573582 A  *   2/2014
(Continued)

*Primary Examiner* — Craig J Price
(74) *Attorney, Agent, or Firm* — Woods Oviatt Gilman LLP; Katherine H. McGuire, Esq.

(57) ABSTRACT

A valve assembly includes: a valve body, having an inner cavity; a first pipeline arranged on the valve body, having one end that communicates with the inner cavity and another end that is configured to be connected to an air pump; a second pipeline arranged on the valve body, having one end that communicates with the inner cavity and another end that is configured to be connected to a bubble spraying interface of a pool; and a third pipeline arranged on the valve body, having one end that communicates with the inner cavity and another end that is configured to be connected to an inflating interface of the pool. When the air pump is in an activated state, the second pipeline is in a communicating state and supplies air to the spray bubble interface, and the third pipeline is in a communicating state and supplies air to the inflating interface.

24 Claims, 2 Drawing Sheets

(51) Int. Cl.
*A61H 33/02* (2006.01)
*F16K 17/04* (2006.01)
*F16K 11/10* (2006.01)

(58) Field of Classification Search
CPC .... A61H 2033/023; A61H 33/60–6094; A61H 2201/0103; A61H 33/601; A61H 33/025; A47K 3/06; A61G 7/0005
USPC .................. 137/561 A, 512, 513; 4/538–595
See application file for complete search history.

(56) References Cited

U.S. PATENT DOCUMENTS

| 9,468,583 | B2 * | 10/2016 | Lin | ............... A61H 33/028 |
| 2007/0094784 | A1 * | 5/2007 | Tran | ............... A61H 33/60 |
| | | | | 4/541.5 |

FOREIGN PATENT DOCUMENTS

| CN | 207314924 | | 5/2018 |
| CN | 207314924 U | * | 5/2018 |
| CN | 208845793 | | 5/2019 |

* cited by examiner

ONE-WAY VALVE AND AIR SUPPLY SYSTEM FOR MASSAGE POOL

TECHNICAL FIELD

The present disclosure relates to the technical field of a massage pool, and in particular, to a one-way valve and an air supply system for a massage pool.

BACKGROUND

In the current urban life, due to the fast pace of life and great work pressure, more leisure ways are needed to increase the joy of life. Compared with the traditional pool, the massage pool has massage and leisure functions so as to make people relax and enjoy life while bathing, thus being widely welcomed by people. The traditional massage pool generally includes two air supply pipelines, one is an inflating pipeline for inflating the pool of the pool, and the other one is a bubble spraying pipeline for spraying bubbles during bathing.

In the traditional massage pool, the inflating pipeline and the bubble spraying pipeline are mutually independent and need to be supplied with air by the air pump respectively. After the air in the pool is saturated, it is necessary to disassemble the air pump and reconnect with the pool to spray bubbles. That is, in the existing art, it is impossible to inflate the pool and spray bubbles to the pool at the same time, thus wasting time and labor in actual operation.

SUMMARY

The problem to be solved by the present disclosure is that it is impossible to inflate the pool and spray bubbles to the pool at the same time, thus wasting time and labor in actual operation.

To solve the above problem, an objective of the present disclosure is to provide a one-way valve. The one-way valve includes: a valve body having an inner cavity; a first pipeline arranged on the valve body, wherein, one end of the first pipeline communicates with the inner cavity and the other end of the first pipeline is configured to be connected to an air pump; a second pipeline arranged on the valve body, wherein, one end of the second pipeline communicates with the inner cavity and the other end of the second pipeline is configured to be connected to a spray bubble interface of a pool; and a third pipeline arranged on the valve body, wherein, one end of the third pipeline communicates with the inner cavity and the other end of the third pipeline is configured to be connected to an inflating interface of the pool; wherein when the air pump is in an activated state, the second pipeline is able to be in a communicating state and supplies air to the spray bubble interface, and the third pipeline is able to be in a communicating state and supplies air to the inflating interface.

Optionally, a sealing member is arranged in the second pipeline, and the first sealing member is able to make the second pipeline conducted under the action of air pressure and seal the second pipeline after pressure relief.

Optionally, a lid is arranged at one end, configured to be connected to the inflating interface, of the third pipeline, and the lid is separatable from the third pipeline to make the third pipeline conducted.

Optionally, the one-way valve further includes a fourth pipeline arranged on the valve body, wherein a second sealing member is arranged in the valve body, and the second sealing member is able to seal the fourth pipeline under the action of air pressure and make the fourth pipeline conducted after pressure relief.

Optionally, along an extending direction of the valve body, the first pipeline and the fourth pipeline are arranged at two ends of the valve body respectively, and the second pipeline and the third pipeline are arranged on an outer circumferential surface of the valve body respectively at intervals.

Optionally, the first sealing member includes: a first valve head and a first elastic member, wherein one end of the first elastic member abuts against the second pipeline and the other end of the first elastic member abuts against the first valve head; the first valve head is attached to a communicating position of the second pipeline and the inner cavity; and the first valve head is separatable from the communicating position under the action of air pressure to make the second pipeline conducted and be attached to the communicating position after pressure relief to seal the second pipeline.

Optionally, the first sealing member further includes: a first valve core, wherein the first valve head is arranged on the first valve core, and the other end of the first elastic member abuts against the first valve core or the first valve head.

Optionally, there are at least two first sealing members which are arranged along an extending direction of the second pipeline at intervals.

Optionally, the first elastic member surrounds the first valve core.

Optionally, a first axial extension portion is arranged in the second pipeline, the first valve core is inserted in the first axial extension portion, and one end of the first elastic member abuts against the first axial extension portion.

Optionally, an outer surface of the first valve head is at least partially spherical or curved.

Optionally, the second pipeline is vertical (perpendicular) to the valve body.

Optionally, the second sealing member includes: a sealing sheet and a second elastic member, wherein one end of the second elastic member abuts against the fourth pipeline and the other end of the second elastic member abuts against the sealing sheet; and the sealing sheet is able to be attached to a communicating position of the fourth pipeline and the inner cavity under the action of air pressure to seal the fourth pipeline and be separated from the communicating position after pressure relief to make the fourth pipeline conducted.

Optionally, the second sealing member further includes: a second valve core, wherein the sealing sheet is arranged on the second valve core, and the second valve core is inserted on the fourth pipeline.

Optionally, the sealing sheet surrounds the second valve core.

Optionally, the other end of the second elastic member abuts against the second valve core or the sealing sheet.

Optionally, a second axial extension portion is arranged on the fourth pipeline, the second valve core is inserted in the second axial extension portion, and the movement of the second valve core away from the second axial extension portion along an axial direction is limited after pressure relief.

Optionally, the one-way valve further includes a bolt, wherein the bolt is inserted in the second valve core; and the bolt is able to abut against one end, away from the sealing sheet, of the second axial extension portion along the axial direction.

Optionally, there is a radial interval between the sealing sheet and the valve body along a radial direction, and the radial interval communicates with the fourth pipeline after pressure relief.

Optionally, the third pipeline is vertical (perpendicular) to the valve body.

Optionally, the third pipeline is closer to the fourth pipeline than the second pipeline.

Optionally, there is an axial interval between the sealing sheet and the fourth pipeline after pressure relief, and the third pipeline is able to communicate with the radial interval through the axial interval.

Optionally, a lid is arranged at one end, configured to be connected to the bubble spraying interface, of the second pipeline, and the lid is separatable from the second pipeline to make the second pipeline conducted.

The present disclosure further provides an air supply system for a massage pool. The air supply system for the massage pool includes: a pool having a bubble spraying interface; the one-way valve as defined in any one of the above, wherein the second pipeline is connected to the bubble spraying interface; and an air pump connected to the first pipeline.

The present disclosure further provides an air supply system for a massage pool. The air supply system for the massage pool includes: a pool having an inflating interface; the one-way valve as defined in any one of the above, wherein the third pipeline is connected to the inflating interface; and an air pump connected to the first pipeline.

The present disclosure further provides an air supply system for a massage pool. The air supply system for the massage pool includes: a pool having a bubble spraying interface and an inflating interface; the one-way valve as defined in any one of the above, wherein the second pipeline is connected to the bubble spraying interface, and the third pipeline being connected to the inflating interface; and an air pump connected to the first pipeline.

As above, the present disclosure provides a one-way valve. The one-way valve includes: a valve body, wherein the valve body has an inner cavity, and a first pipeline, a second pipeline and a third pipeline are arranged on the valve body. One end of the first pipeline communicates with the inner cavity and the other end of the first pipeline is configured to be connected to an air pump; one end of the second pipeline communicates with the inner cavity and the other end of the second pipeline is configured to be connected to a bubble spraying interface of a pool; and one end of the third pipeline communicates with the inner cavity and the other end of the third pipeline is configured to be connected to an inflating interface of the pool. When the air pump is in an activated state, the second pipeline is able to be in a communicating state and supply air to the spray bubble interface, and the third pipeline is able to be in a communicating state and supply air to the inflating interface. The pool is inflated and bubbles are sprayed to the pool at the same time, so that the one-way valve according to the present disclosure may achieve two functions of inflating and spraying bubbles at the same time through one air pump.

To make the above content of the present disclosure more obvious and understandable, the following will describe in detail by giving preferred embodiments and with reference to the accompanying drawings.

DETAILED DESCRIPTION OF THE EMBODIMENTS

The implementation manner of the present disclosure is described below by the specific embodiments. Those skilled in the art may easily understand other advantages and effects of the present disclosure by the contents disclosed by the specification. Although the description of the present disclosure will be introduced together with preferred embodiments, it does not mean that the features of the present disclosure are not limited to the implementation manner. On the contrary, the objective of introducing the present disclosure with reference to the implementation manner is to cover other options or modifications that may be extended based on the claims of the present disclosure. To provide a deep understanding of the present disclosure, many specified details will be included in the following description. The present disclosure may also be implemented without using these details. In addition, to avoid confusion or obscuring of the focus of the present disclosure, some specific details will be omitted in the description. It should be noted that the embodiments in the present disclosure and features in the embodiments may be combined with each other in a non-conflicting situation.

Figure 1:
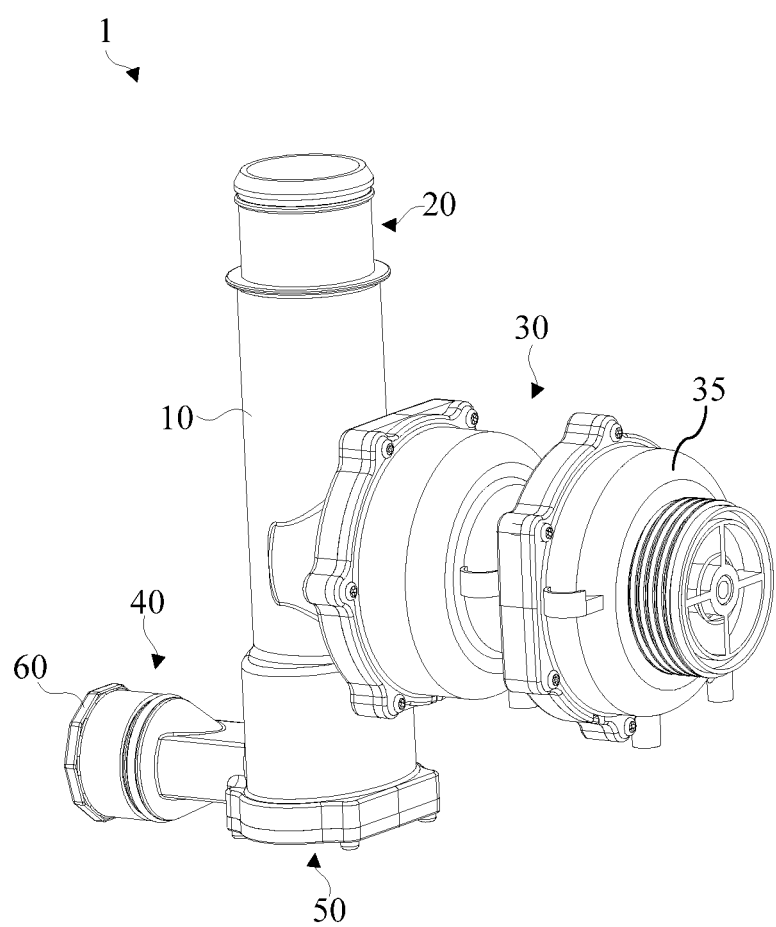
FIG. 1 is a solid diagram of a one-way valve according to the present disclosure.
Figure 2:
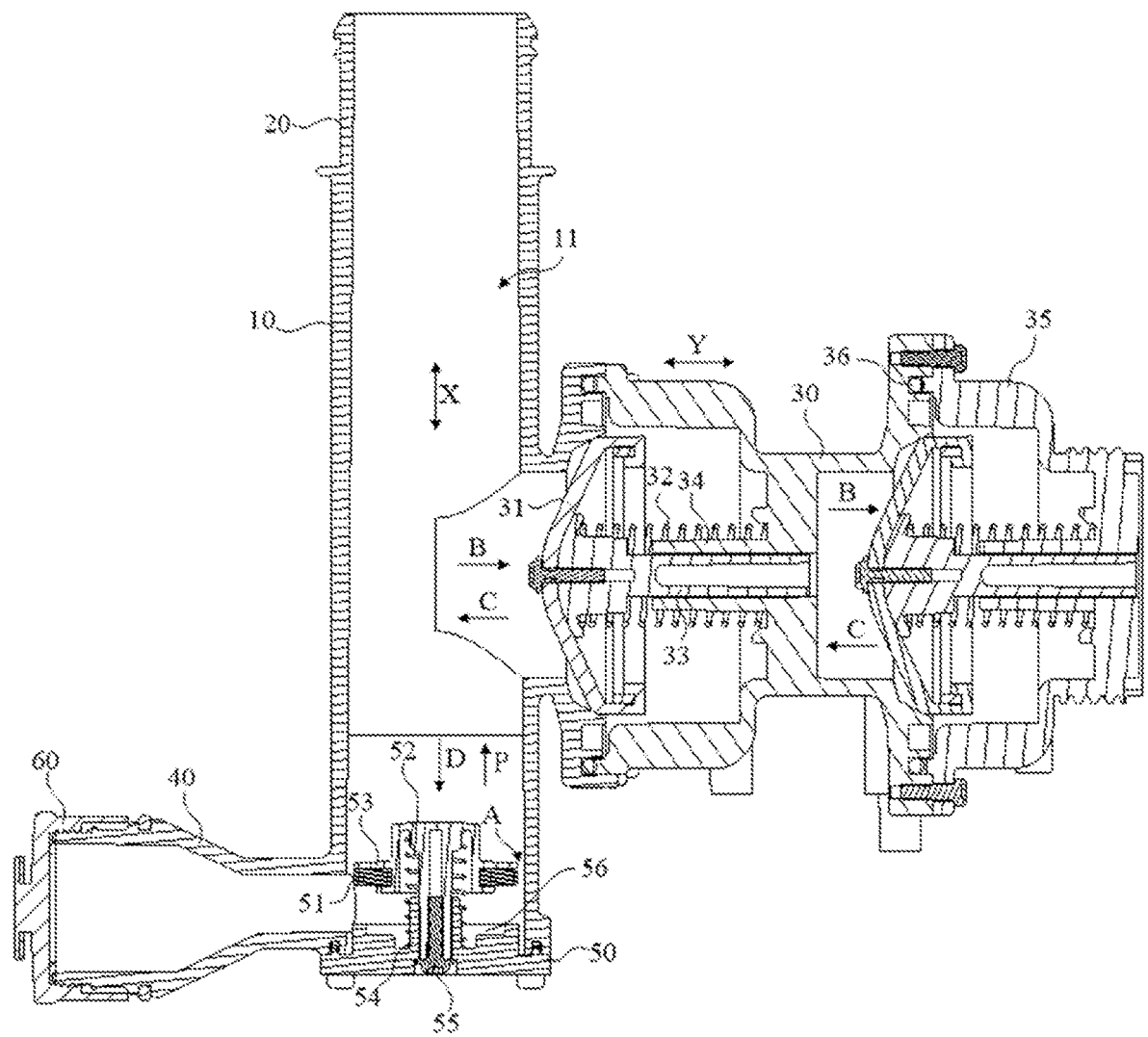
FIG. 2 is a section view of a one-way valve according to the present disclosure.

Referring to FIG. 1 and FIG. 2, the embodiment of the present disclosure provides a one-way valve 1. The one-way valve 1 includes: a valve body 10, wherein the valve body 10 has an inner cavity 11, and a first pipeline 20, a second pipeline 30 and a third pipeline 40 are arranged on the valve body 10. Along an extending direction of the first pipeline 20, one end of the first pipeline 20 communicates with the inner cavity 11 and the other end of the first pipeline 20 is configured to be connected to an air pump (not shown in the figure); along an extending direction of the second pipeline 30, one end of the second pipeline 30 communicates with the inner cavity 11 and the other end of the second pipeline 30 is configured to be connected to a bubble spraying interface (not shown in the figure) of a pool (not shown in the figure); and along an extending direction of the third pipeline 40, one end of the third pipeline communicates with the inner cavity 11 and the other end of the third pipeline 40 is configured to be connected to an inflating interface (not shown in the figure) of the pool.

When the air pump is in an activated state, the inner cavity 11 of the valve body 10 will generate air pressure. Under the action of the air pressure, the second pipeline 30 is able to be in a communicating state and supply air to the bubble spraying interface, the third pipeline 40 is in a closed state, and bubbles are sprayed to the pool through the second pipeline 30. Or when the air pump is in an activated state, the second pipeline 30 is able to be in a communicating state and supply air to the bubble spraying interface, and the third pipeline 40 is able to be in a communicating state and supply air to the inflating interface, so that bubbles are sprayed to the pool through the second pipeline 30 and the pool is inflated through the third pipeline 40. Or when the air pump is in an activated state, the inner cavity 11 of the valve body 10 will generate air pressure. Under the action of the air pressure, the third pipeline 40 is able to be in a communicating state and supply air to the inflating interface, so that bubbles are sprayed to the pool through the second pipeline 30 and the pool is inflated through the third pipeline 40; and the second pipeline 30 is in a closed state. Therefore, by the one-way valve 1 according to the present disclosure, the functions of inflating and spraying bubbles may be achieved at the same time through one air pump.

When the air pump is in a closed state, the inner cavity 11 of the valve body 10 relieves pressure, the second pipeline 30 does not supply air to the bubble spraying interface and the third pipeline 40 does not supply air to the inflating interface.

In the embodiment, a lid (not shown in the figure) is arranged at one end, configured to be connected to the bubble spraying interface, of the second pipeline 30, and the lid is separatable from the second pipeline 30 to make the second pipeline 30 conducted. After the lid is unscrewed, the lid is separated from the second pipeline 30 and the second pipe 30 is conducted under the action of air pressure. In other embodiments, one end, configured to be connected to the bubble spraying interface, of the second pipeline is not provided with a lid.

Referring to FIG. 2, in this embodiment, a first sealing member is arranged in the second pipeline 30. After the lid is unscrewed and when the air pump is in an activated state, the first sealing member is able to make the second pipeline 30 in the inner cavity 11 of the valve body 10 conducted under the action of air pressure; and when the air pump is in a closed state, the inner cavity 11 of the valve body 10 relieves pressure, and the first sealing member seals the second pipeline 30 after pressure relief.

The first sealing member includes: a first valve head 31 and a first elastic member 32, wherein along an extending direction of the second pipeline 30 (shown in a Y direction in FIG. 2), one end of the first elastic member 32 abuts against the second pipeline 30 and the other end of the first elastic member 32 abuts against the first valve head 31; the first valve head 31 is attached to a communicating position of the second pipeline 30 and the inner cavity 11; and the first valve head 31 is separatable from the communicating position of the second pipeline 30 and the inner cavity 11 under the action of air pressure to make the second pipeline 30 conducted and be attached to the communicating position of the second pipeline 30 and the inner cavity 11 after pressure relief to seal the second pipeline 30. In this embodiment, the first elastic member 32 is a spring. In other embodiments, there may be other types of elastic members capable of applying an elastic force to the first valve head.

In this embodiment, the first sealing member further includes: a first valve core 33, wherein the first valve head 31 is arranged on the first valve core 33, and the other end of the first elastic member 32 abuts against the first valve core 33 or the first valve head 31. In this embodiment, the first elastic member 32 surrounds (forms a sleeve around) the first valve core 33. In combination with the first valve core 33 and the first elastic member 32, the movement stability of the first valve head 31 in the extending direction is improved, so that the first valve head 31 is attached to or separated from the communicating position of the second pipeline 30 and the inner cavity 11. Equivalently, the first valve core 33 may play a guiding role. In other embodiments, the first elastic member may not surround the first valve core.

Further, in this embodiment, a first axial extension portion 34 is arranged in the second pipeline 30, the first valve core 33 is inserted in the first axial extension portion 34, and one end of the first elastic member 32 surrounds the first axial extension portion 34 and abuts against the first axial extension portion 34. The first valve core 33 is able to move along the extending direction of the second pipeline 30 relative to the first axial extension portion 34. Equivalently, the first axial extension portion 34 may play a guiding role.

Specifically, when the air pump is in an activated state, under the action of the air pressure in the inner cavity 11 of the valve body 10, the first elastic member 32 of the first sealing member is compressed, the first valve head 31 is separated from the communicating position of the second pipeline 30 and the inner cavity 11, the first valve head 31 is pushed open, the first valve core 33 moves along the extending direction of the second pipeline 30 relative to the first axial extension portion 34, the first valve head 31 moves along a direction (shown in a direction B in FIG. 2) departing from the inner cavity 11 of the valve body 10 to make the second pipeline 30 conducted, the second pipeline 30 supplies air to the bubble spraying interface, bubbles are sprayed to the water pool through the second pipeline 30, and bubbles are formed at the bottom of the pool to achieve a bubbling function. When the air pump is in an activated state, under the action of the air pressure in the inner cavity 11 of the valve 10, the first elastic member 32 maintains a compressed state.

When the air pump is in a closed state, the inner cavity 11 of the valve body 10 relieves pressure. After pressure relief, the first elastic member 32 returns, the first valve core 33 moves along the extending direction of the second pipeline 30 relative to the first axial extension portion 34, and the first valve head 31 moves along a direction (shown in a direction C in FIG. 2) facing toward the inner cavity 11 of the valve body 10 under the action of an elastic force until the first valve head 31 is attached to the communicating position of the second pipeline 30 and the inner cavity 11 to seal the second pipeline 30.

According to the present disclosure, there are at least two first sealing members which are arranged along the extending direction of the second pipeline 30 at intervals. Referring to FIG. 2, in this embodiment, there are two first sealing members which are arranged along the extending direction (shown in a direction Y in FIG. 2) of the second pipeline 30 at intervals. In other embodiments, other numbers of first sealing members may be provided.

In addition, in this embodiment, the first valve head 31 is spherical. An outer surface of the first valve head 31 may be a complete spherical surface and may also be a partial spherical surface (a rounded or curved surface). After this arrangement, the first valve core 33 may be effectively limited and fixed when the one-way valve 1 is ventilated and when the one-way valve 1 does not work, the first valve core 33 does not swing along a radial direction (a direction vertical to the extending direction of the second pipeline 30), the first valve head 31 may be reset accurately and attached to the communicating position of the second pipeline 30 and the inner cavity 11 when the first elastic member 32 is reset, thus preventing the defects of non-tight sealing and damage to the one-way valve 1 due to inclination and dislocation of the first valve core 33 caused by that the first valve core 33 swings when the first elastic member 32 resets.

In addition, continuously referring to FIG. 2, in this embodiment, an inclined surface matched with the spherical first valve head 31 is arranged at the communicating position of the second pipeline 30 and the inner cavity 11, so that the outer surface of the first valve head 31 is attached to the inclined surface to realize sealing.

It should be noted that in this embodiment, the second pipeline 30 is vertical (perpendicular) to the valve body 10, so that the air pressure in the inner cavity 11 of the valve body 10 acts on the second pipeline 30. That is, the extending direction (shown in the direction Y in FIG. 2) of the second pipeline 30 is vertical (perpendicular) to the extending direction (shown in a direction X in FIG. 2) of the valve body 10. In other embodiments, the second pipeline may be not vertical (not perpendicular) to the valve body, and the inner cavity of the valve body is able to communicate with the second pipeline.

Continuously referring to FIG. 1 and FIG. 2, in this embodiment, the first pipeline 30 is provided with an end cover 35. Along the extending direction of the second pipeline 30, the end cover 35 is arranged on a body portion of the second pipeline 30, and a sealing member 36 is arranged between the end cover 35 and the body portion of the second pipeline 30. In this embodiment, the sealing member 36 is an O-shaped sealing ring. In other embodiments, there may be other types of sealing members which can realize sealing between the end cover and the body portion of the second pipeline.

Referring to FIG. 1 and FIG. 2, in this embodiment, a lid 60 is arranged at one end, configured to be connected to an inflating interface, of the third pipeline 40. The lid 60 covers one end, configured to be connected to the inflating interface, of the third pipeline 40. After the lid 60 is unscrewed, the lid 60 is separated from the third pipeline 40, so that conduction of the third pipeline 40 can be realized. The third pipeline 40 is connected to the inflating interface, so that the pool may be inflated. After the pool is inflated, the third pipeline 40 is separated from the inflating interface, one end, configured to be connected to the inflating interface, of the third pipeline 40 is screwed on the lid 60, and the third pipeline 40 is in a closed state.

Equivalently, in this embodiment, the lid 60 is arranged on the third pipeline 40, thus controlling the third pipeline 40 to be in a communicating state or a closed state. In other embodiments, the third pipeline may be conducted or closed by other methods. For example, a control valve is mounted in the third pipeline, and the third pipeline is conducted or closed by opening or closing the control valve.

Referring to FIG. 1 and FIG. 2, the one-way valve 1 according to the present disclosure further includes: a fourth pipeline 50 arranged on the valve body 10, wherein a second sealing member is arranged in the valve body 10, and the second sealing member is able to seal the fourth pipeline 50 under the action of air pressure and make the fourth pipeline 50 conducted after pressure relief. In this embodiment, along the extending direction (shown in the direction X in FIG. 2) of the valve body 10, the first pipeline 20 and the fourth pipeline 50 are arranged at two ends of the valve body 10 respectively, and the second pipeline 30 and the third pipeline 40 are arranged on an outer circumferential surface of the valve body 10 at intervals. The third pipeline 40 is vertical (perpendicular) to valve body 10. In other embodiments, the third pipeline may be not vertical (not perpendicular) to the valve body, and the inner cavity of the valve body is able to communicate with the third pipeline. Referring FIG. 1 and FIG. 2, in this embodiment, the third pipeline 40 is closer to the fourth pipeline 50 than the second pipeline 30.

The second sealing member includes: a sealing sheet 51 and a second elastic member 52. Along the extending direction (shown in the direction X in FIG. 2) of the valve body 10, one end of the second elastic member 52 abuts against the fourth pipeline 50 and the other end of the second elastic member 52 abuts against the second valve core 53. The sealing sheet 51 is able to be attached to a communicating position of the fourth pipeline 50 and the inner cavity 11 under the action of air pressure to seal the fourth pipeline 50 and be separated from the communicating position of the fourth pipeline 50 and the inner cavity 11 after pressure relief to make the fourth pipeline 50 conducted. In this embodiment, the second elastic member 52 is a spring. In other embodiments, there may be other types of elastic members capable of applying an elastic force to the sealing sheet.

In this embodiment, the second sealing member further includes: a second valve core 53. The sealing sheet 51 is arranged on the second valve core 53 and the second valve core 53 is inserted on the fourth pipeline 50. In this embodiment, the sealing sheet 51 surrounds (forms a sleeve around) the second valve core 53. The other end of the second elastic member 52 abuts against the second valve core 53. In this embodiment, the second elastic member 52 surrounds (forms a sleeve around) the second valve core 53. In combination with the second valve core 53 and the second elastic member 52, the movement stability of the sealing sheet 51 in the extending direction of the valve body 10 is improved, so that the sealing sheet 51 is attached to or separated from the communicating position of the fourth pipeline 50 and the inner cavity 11. Equivalently, the second valve core 53 may play a guiding role. In other embodiments, the second elastic member may not surround the second valve core.

Continuously referring to FIG. 2, in this embodiment, a second axial extension portion 54 is arranged on the fourth pipeline 50, the second valve core 53 is inserted in the second axial extension portion 54, and the movement of the second valve core 53 away from second axial extension portion 54 along an axial direction is limited after pressure relief. The second valve core 53 is able to move along the extending direction of the valve body 10 relative to the second axial extension portion 54. Equivalently, the second axial extension portion 54 may play a guiding role.

In this embodiment, a bolt 55 is inserted in the second valve core 53. The bolt 55 is able to abut against on end, away from the sealing sheet 51, of the second axial extension portion 54 along the axial direction. The axial direction is consistent with the extending direction of the valve body 10. After the bolt 55 is arranged and the second elastic member 52 returns, the movement of the second valve core 53 away from the second axial extension portion 54 along the axial direction is limited, thus preventing the second valve core 53 from falling off the second axial extension portion 54 in the movement process and avoiding the influence on the sealing of the fourth pipeline 50.

Specifically, when the air pump is in an activated state, under the action of the air pressure in the inner cavity 11 of the valve body 10, the second elastic member 52 is compressed, the second valve core 53 moves along the extending direction of the valve body 10 relative to the second axial extension portion 54, the sealing sheet 51 moves along a direction (shown in a direction D in FIG. 2) facing toward the fourth pipeline 50, the sealing sheet 51 is attached to the communicating position of the fourth pipeline 50 and the inner cavity 11 under the action of the air pressure, and an opening 56 of the fourth pipeline 50 is closed, thereby realizing sealing of the fourth pipeline 50. After this arrangement, the air pressure in the inner cavity 11 of the valve body 10 may act on the second pipeline 30 and the third pipeline 40 well, the second pipeline 30 and the third pipeline 40 are able to communicate with the inner cavity 11 of the valve body 10, and the second pipeline 30 and the third pipeline 40 may completely utilize the air pressure in the inner cavity 11, thus achieving the bubbling and inflating functions. When the air pump is in an activated state, under the action of the air pressure in the inner cavity 11 of the valve 10, the second elastic member 52 maintains a compressed state, the second pipeline 30 may continuously realize the bubbling function, and the third pipeline 40 may continuously realize the inflating function.

When the air pump is in a closed state, the inner cavity 11 of the valve body 10 relieves pressure. After pressure relief, the second elastic member 52 returns, the second valve core 53 moves along the extending direction of the valve body 10 relative to the second axial extension portion 54, the sealing sheet 51 moves along a direction (shown in a direction P in FIG. 2) away from the fourth pipeline 50 until the sealing sheet 51 is separated from the communicating position of the fourth pipeline 50 and the inner cavity 11, and the opening 56 of the fourth pipeline 50 is in an open state, thus realizing conduction of the fourth pipeline 50.

In this embodiment, along a radial direction (a direction vertical to the extending direction of the valve body 10), the sealing sheet 51 and an inner wall of the valve body 10 have a radial interface A. after the inner cavity 11 of the valve body 10 relieves pressure, the radial interval A communicates with the fourth pipeline 50. After this arrangement, when the first elastic member 32 and the second elastic member 52 are in failure (malfunctioning), water in the pool flows back, but does not flow to one end of the air pump and directly flows out from the bottom of the one-way valve 1, that is, water flows to the fourth pipeline 50 through the radial interval A and finally flows out directly from the fourth pipeline 50, thereby effectively protecting normal work of the air pump and other parts.

In addition, referring to FIG. 2, in this embodiment, after the inner cavity 11 of the valve body 10 relieves pressure, there is an axial interval between the sealing sheet 51 and the fourth pipeline 50, and the third pipeline 40 is able to communicate with the radial interval A through the axial interval. When the first elastic member 32 and the second elastic member 52 are in failure (malfunctioning), water in the pool flows back and water may also flow out through the third pipeline 40. In addition, the inflating function of the third pipeline 40 will not be affected.

The embodiment of the present disclosure further provides an air supply system for a massage pool (not shown in the figure). The air supply system for the massage pool includes: a pool, the pool having a bubble spraying interface; the one-way valve 1 as defined in any one of the above embodiments, the second pipeline 30 of the one-way valve 1 being connected to the bubble spraying interface; and an air pump, connected to the first pipeline 20. The bubbling function is realized by the one-way valve 1.

The embodiment of the present disclosure further provides an air supply system for a massage pool (not shown in the figure). The air supply system for the massage pool includes: a pool, the pool having an inflating interface; the one-way valve 1 as defined in any one of the above embodiments, the third pipeline 40 of the one-way valve 1 being connected to the inflating interface; and an air pump, connected to the first pipeline 20. The inflating function is realized by the one-way valve 1.

The embodiment of the present disclosure further provides an air supply system for a massage pool (not shown in the figure). The air supply system for the massage pool includes: a pool, the pool having a bubble spraying interface and an inflating interface; the one-way valve 1 as defined in any one of the above embodiments, the second pipeline 30 of the one-way valve 1 being connected to the bubble spraying interface, and the third pipeline 40 of the one-way valve 1 being connected to the inflating interface; and an air pump, connected to the first pipeline 20. The bubbling and inflating functions are realized by the one-way valve 1. The inflating interface and the bubble spraying interface may be located at the same pool and may also be located at different pool bodies. Equivalently, the same one-way valve 1 may perform inflating and bubbling operation for the same pool, and may also perform inflating and bubbling operation for different pool bodies.

In conclusion, the above embodiments provided by the present disclosure are only intended to exemplarily illustrate the principle and effect of the present disclosure, but not intended to limit the present disclosure. Any person skilled in the art may modify or change the above embodiments without departing from the spirit and scope of the present disclosure. Therefore, all equivalent modifications or changes made by those with ordinary knowledge in the art without departing the spirit and technical ideal disclosed by the present disclosure should still be covered within the claims of the present disclosure.

What is claimed is:

1. A valve assembly, comprising:
    a valve body, having an inner cavity;
    a first pipeline arranged on the valve body, wherein, one end of the first pipeline communicates with the inner cavity and an other end of the first pipeline is configured to be connected to an air pump;
    a second pipeline arranged on the valve body, wherein, one end of the second pipeline communicates with the inner cavity and the other end of the second pipeline is configured to be connected to a spray bubble interface of a pool;
    a third pipeline arranged on the valve body, wherein, one end of the third pipeline communicates with the inner cavity and the other end of the third pipeline is configured to be connected to an inflating interface of the pool;
    wherein when the air pump is in an activated state, the second pipeline is in a communicating state and supplies air to the spray bubble interface, and the third pipeline is in a communicating state and supplies air to the inflating interface;
    a first sealing member is arranged in the second pipeline, and the first sealing member is configured to make the second pipeline conducted under an action of air pressure and seal the second pipeline after pressure relief; and
    a fourth pipeline arranged on the valve body, wherein a second sealing member is arranged in the valve body, and the second sealing member is configured to seal the fourth pipeline under the action of air pressure and make the fourth pipeline conducted after pressure relief.

2. The valve assembly according to claim 1, wherein a lid is arranged at one end, configured to be connected to the inflating interface, of the third pipeline, and the lid is separatable from the third pipeline to make the third pipeline conducted.

3. The valve assembly according to claim 1, wherein along an extending direction of the valve body, the first pipeline and the fourth pipeline are arranged at two ends of the valve body respectively, and the second pipeline and the third pipeline are arranged on an outer circumferential surface of the valve body respectively at intervals.

4. The valve assembly according to claim 1, wherein the first sealing member comprises a first valve head and a first elastic member;
    wherein one end of the first elastic member abuts against the second pipeline and the other end of the first elastic member abuts against the first valve head;

wherein the first valve head is attached to a communicating position of the second pipeline and the inner cavity; and wherein the first valve head is configured to be separatable from the communicating position under the action of air pressure to make the second pipeline conducted and be attached to the communicating position after pressure relief to seal the second pipeline.

5. The valve assembly according to claim 4, wherein the first sealing member further comprises a first valve core, the first valve head is arranged on the first valve core, and the other end of the first elastic member abuts against the first valve core or the first valve head.

6. The valve assembly according to claim 5, wherein the first elastic member surrounds the first valve core.

7. The valve assembly according to claim 5, wherein a first axial extension portion is arranged in the second pipeline, the first valve core is inserted in the first axial extension portion, and one end of the first elastic member abuts against the first axial extension portion.

8. The valve assembly according to claim 4, wherein there are at least two first sealing members which are arranged along an extending direction of the second pipeline at intervals.

9. The valve assembly according to claim 4, wherein an outer surface of the first valve head is at least partially spherical or curved.

10. The valve assembly according to claim 1, wherein the second pipeline is perpendicular to the valve body.

11. The valve assembly according to claim 1, wherein the second sealing member comprises a sealing sheet and a second elastic member;
wherein one end of the second elastic member abuts against the fourth pipeline and the other end of the second elastic member abuts against the second valve core; and
wherein the sealing sheet is configured to be attached to a communicating position of the fourth pipeline and the inner cavity under the action of air pressure to seal the fourth pipeline and be separatable from the communicating position after pressure relief to make the fourth pipeline conducted.

12. The valve assembly according to claim 11, wherein the second sealing member further comprises the second valve core, wherein the sealing sheet is arranged on the second valve core, and the second valve core is inserted in the fourth pipeline.

13. The valve assembly according to claim 12, wherein the sealing sheet surrounds the second valve core.

14. The valve assembly according to claim 12, wherein the other end of the second elastic member abuts against the second valve core.

15. The valve assembly according to claim 12, wherein a second axial extension portion is arranged on the fourth pipeline, the second valve core is inserted in the second axial extension portion, and the movement of the second valve core away from the second axial extension portion along an axial direction is limited after pressure relief.

16. The valve assembly according to claim 15, further comprising a bolt, wherein, the bolt is inserted in the second valve core, and the bolt is configured to abut against one end, away from the sealing sheet, of the second axial extension portion along the axial direction.

17. The valve assembly according to claim 11, wherein there is a radial interval between the sealing sheet and the valve body along a radial direction, and the radial interval communicates with the fourth pipeline after pressure relief.

18. The valve assembly according to claim 17, wherein there is an axial interval between the sealing sheet and the fourth pipeline after pressure relief, and the third pipeline is configured to communicate with the radial interval through the axial interval.

19. The valve assembly according to claim 1, wherein the third pipeline is perpendicular to the valve body.

20. The valve assembly according to claim 1, wherein the third pipeline is closer to the fourth pipeline than the second pipeline.

21. The valve assembly according to claim 1, wherein a lid is arranged at one end, configured to be connected to the spray bubble interface, of the second pipeline, and the lid is configured to be separatable from the second pipeline to make the second pipeline conducted.

22. An air supply system for a massage pool, comprising:
a pool having the spray bubble interface;
the valve assembly as defined in claim 1, wherein the second pipeline is connected to the spray bubble interface; and
the air pump connected to the first pipeline.

23. An air supply system for a massage pool, comprising:
a pool having the inflating interface;
the valve assembly as defined in claim 1, wherein the third pipeline is connected to the inflating interface; and
the air pump connected to the first pipeline.

24. An air supply system for a massage pool, comprising:
a pool having the spray bubble interface and the inflating interface;
the valve assembly as defined in claim 1, wherein the second pipeline is connected to the spray bubble interface, and the third pipeline is connected to the inflating interface; and
the air pump connected to the first pipeline.

* * * * *